United States Patent [19]

Goor et al.

[11] Patent Number: 4,581,109
[45] Date of Patent: Apr. 8, 1986

[54] MAGNETIC PLATED MEDIA AND PROCESS THEREOF

[75] Inventors: Dan Goor, Colorado Springs, Colo.; Everett Niles, San Jose, Calif.; Robert L. Stone, Monument, Colo.

[73] Assignee: Digital Equipment Corporation, Maynard, Mass.

[21] Appl. No.: 560,478

[22] Filed: Dec. 12, 1983

[51] Int. Cl.$^4$ .......................... C25D 5/12; C25D 5/50
[52] U.S. Cl. .................................... 204/371; 204/38.4; 204/40
[58] Field of Search ....................... 204/38.4, 40, 35.1, 204/37.1; 428/900

[56] References Cited

U.S. PATENT DOCUMENTS

| | | | |
|---|---|---|---|
| 3,634,209 | 1/1972 | Wolf et al. | 204/40 |
| 3,681,225 | 8/1972 | Genma et al. | 204/30 |
| 3,726,771 | 4/1973 | Coll-Palagos | 204/38.4 |
| 3,886,052 | 5/1975 | Smith | 204/33 |

Primary Examiner—Andrew H. Metz
Assistant Examiner—William T. Leader
Attorney, Agent, or Firm—Cesari and McKenna

[57] ABSTRACT

A process for producing magnetic plated media suitable for use in high-performance disk drives is disclosed. A layer of nickel is first provided on a standard aluminum alloy substrate, by electroless deposition, to improve adhesion of subsequent layers. A layer of nickel phosphorous and a magnetic layer of nickel cobalt are then, in turn, electroplated. The plated media disk is then oxidized below a nickel-magnetizing temperature to provide a protective outer surface.

A variation of this process is also disclosed. This time a magnetically-shielding copper layer is electroplated over the first nickel layer. The nickel phosphorous and nickel cobalt layers are then electroplated on as before. The plated media can now be oxidized at a temperature higher than the nickel-magnetizing temperature to speed up the process.

5 Claims, 2 Drawing Figures

MAGNETIC PLATED MEDIA AND PROCESS THEREOF

BACKGROUND

This invention relates to the plating of magnetic media, and more specifically to a process utilizing an electroplating process for the deposition of a thin magnetic layer.

Most currently available plated media, used as magnetic disks for mass storage in data processing, are produced by totally electroless processes. The main problem with such plated media is that their performance is limited by noise problems arising from the electro-magnetic characteristics of the plated layers. The noise problems are created within the magnetic layer by the electroless processes. These processes produce non-uniform layers by forming uneven crystalline structures, by including contaminants in the layer, and by forming occasional plating voids. Each of these plating phenomena will contribute to noise in high density memory devices. This problem is particularly acute in high performance applications, where higher storage densities are required.

A known process to reduce the noise problem utilizes electroplated media. It starts with an heat-treatable alloy, such as the 7075 type available from Alcoa Aluminum, which is then anodized to provide a smooth adhesion surface. A layer of copper is deposited on the anodized surface by electroplating and is then polished. A layer of nickel-cobalt (NiCo) is electroplated over the now smooth copper layer and is then exposed to some temperature for a period of time sufficient to produce an oxidation layer. For example it may be exposed to a temperature range of 580° to 680° F. for approximately an hour. The main problem with this process is that it depends on a non-standard heat-treatable aluminum alloy substrate that can be easily anodized. Such a substrate, although commercially available, is a non-standard item and is very expensive.

SUMMARY

The present invention solves these and other problems by providing a magnetic plated media disk in which a layer of nickel is first provided on a standard aluminum alloy substrate, by electroless deposition, to improve the adhesion of subsequent layers. In a first embodiment, a layer of nickel phosphorus and a magnetic layer of nickel-cobalt are then, in turn, electroplated. The disk is then oxidized below a nickel-magnetizing temperature to provide a protective wear surface. In a second embodiment a magnetically shielding copper layer is electroplated over the first nickel layer to allow the oxidation of the disk at a temperature higher than the nickel-magnetizing temperature.

DESCRIPTION

Figure 1:
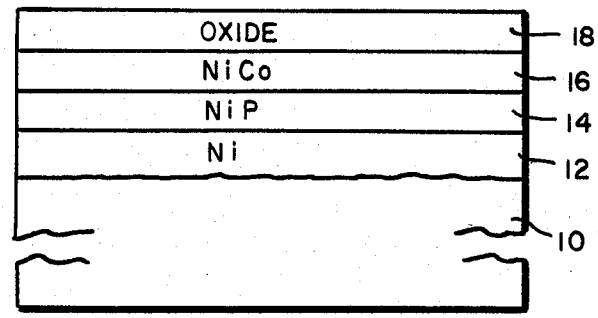
FIG. 1 shows a cross-section of a portion of a disk manufactured by a first embodiment of the process of the present invention.

Referring now to FIG., 1. there is shown a portion 10 of the aluminum alloy substrate contemplated by the present invention. Preferably, such a substrate is a standard aluminum alloy, for example type 5086 available from Alcoa Aluminum, having the shape of a disk suitable for use in disk drives of the type used in computer systems for magnetic storage. The surface of substrate 10 is preferably polished to a smoothness within a range of 0.2 to 0.5 microinches (arithmetic average).

Standard aluminum alloys do not anodize well, thus they prevent the satisfactory adhesion of the subsequent layers in the electroplating process. It has been found that a layer 12 of nickel, provided by a conventional electroless deposition forms a reliable adhesion layer. Such conventional electroless deposition process is commercially available from companies such as McDermid, Enthone, Shipley, etc.

For example, the substrate 10 is plated at a rate of 1.5 microinch per minute at a temperature of 182° to 184° F. in an electroless nickel bath of the following composition:

$NiSO_4*6H_2O$—20 grams per liter
$N_aH_2PO*H_2O$—22.5 grams per liter
$NaC_2H_3O_2$—23 grams per liter
Malic Acid—6.9 grams per liter
Lactic Acid—8.2 grams per liter
$SnCl_2$—38 mg per liter Other plating baths may be used, for instance Enthone EN422 available from Enthone Inc. In general, bath conditions such as temperature, nickel concentration and pH control the plating rate. An important requirement is that the plated nickel must not become magnetic. The thickness of the adhesion layer 12 is sufficient to compensate for the asperity, or unevenness, of the surface of the alloy substrate 10, which is normally due to the presence of impurities.

The nickel plated disk is now polished, and layer 14 of nickel-phosphorous (NiP) is then deposited by electroplating over the nickel adhesion layer 12. This is achieved by conventionally electroplating the nickel coated disk in a nickel-phosphorous bath; for example, at a temperature of 120° F. using 2 amps at 1.5 to 1.8 volts in a bath of the following composition:

$NiSO_4*6H_2O$—50 grams per liter
$Na_2SO_4$—50 grams per liter
$H_2BO_3$—20 grams per liter
$NaH_2PO_2*H_2O$—10 grams per liter
Antipit #12—70 oz. per 370 liters Antipit is a commercially available from M & T Chemicals, Inc. It is a hydrocarbon mixture containing wetting agents and surface enhancing materials which inhibit the adhesion of Hydrogen gas bubbles to surfaces during plating operations. Thus, surface roughness due to pitting does not occur. The absence of pitting in the NiP layer contributes to the low noise characteristics of the product disk.

In this and all the other electroplating steps, the anode is attached to a plating fixture inserted in the disk's central opening. The NiP coated disk is now rinsed and a magnetic layer 16 formed of nickel-cobalt is now deposited. Again, this is achieved by conventionally electroplating the NiP coated disk in a nickel-cobalt bath; for example, at a temperature of 84° F. using 11 amps at 3.0 to 3.5 volts in a bath of the following composition:

$NiSO_4*6H_2O$—50 grams per liter
$NaSO_4$—50 grams per liter
$CoSO_4*7H_2O$—27.5 grams per liter
$H_3BO_3$—12 grams per liter
$NaH_2PO_2*H_2O$—0.48 grams per liter Antipit #12–70 oz. per 370 liters
The Ni-Co coated disk is then polished.

The substrate 10 and corresponding deposited layers 12 through 16 are now heated at a temperature of approximately 520° F. for a period of 2 to 12 hours to provide an oxide layer 18. Oxide layer 18 serves as the outer protective layer for the media surface. The oxidation step also serves to anneal the plated media to further improve adhesion among layers. The electromagnetic characteristics of the plated media, and more specifically the coercivity, are dependent on several parameters, such as the ratio of nickel to cobalt of the magnetic layer 16, the amount of phosphorus that diffuses into this layer 16, and the thickness of the magnetic layer. In the preferred embodiment the ratio of nickel to cobalt has been approximately 2:8. Diffusion of the phosphorous has been limited approximately from 1 to 2%. For a thickness of layer 16 of from 3 to 4 microinches the resulting coercivity is approximately 450 to 650 oersteds. Table 1 shows a representative sample of operational conditions to produce the stated coercive forces in high-density disks.

TABLE 1

| COERCIVITY | ATOMIC % PHOSPHORUS | OXIDE PROCESS TEMP. | TIME | MAGNETIC LAYER THICKNESS |
|---|---|---|---|---|
| 450 oe | 0.8 | 580–600 | 1–2 hr. | 3–2 u" |
| 650 oe | 1.0 | 620 | 2–2.5 hr. | 3.0 u" |
| 1200 oe | 1.3 | 620 | 1–1.75 hr. | 2.8–3.0 u" |

In the present process it is important that the layers under the magnetic layer 16 do not become magnetic, or the media will not be useable in standard storage systems.

To prevent the nickel layer 12 from becoming magnetic it is insulated from the magnetic layer 16 by the nickel phosphorous layer 14 which is nonmagnetic provided that the concentration of phosphourous is greater than approximately 10.5%. Additionally, nickel becomes magnetic at or above approximately 530° F., thus the oxidation treatment must not approach or exceed 530° F.

Figure 2:
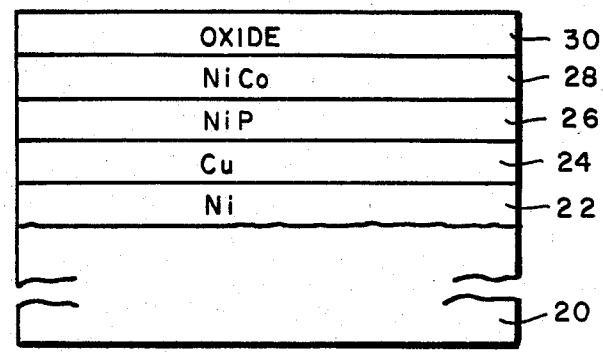
FIG. 2 shows a cross-section of a portion of a disk manufactured by a second embodiment of the process of the present invention.

In a second embodiment of the invention, the process starts with the same standard aluminum alloy substrate, shown as 20 in FIG. 2, as before. Again, a layer 22 of nickel deposited by an electroless deposition process is provided as the adhesion layer. This is followed by the deposition of a copper layer 24 by an electroplating process. Since the nickel layer 22 is followed by the magnetically inert copper layer 24, it need not be as thick as in the first method described, since the asperity of the surface of substrate 20 will be compensated for by the composite thickness of these two layers. For example, the thickness of the nickel layer 22 is approximately from 90 to 120 microinches, while the thickness fo the copper layer 24 is approximately 500 microinches.

The copper is deposited by a conventional electroplating process, for example, by using a current of 54 amps at 2 volts in a bath of the following composition:
$CuSO_4 * 5H_2O$—200 grams per liter
$H_2SO_4$—4% by volume
HCL(chloride ion)—30 mg per liter
UBAC—4.0 ml per liter
where UBAC is a produt available from UDYLITE Inc. Its active agents are an organic dye, and certain organic acids of chain-lenght 8 to 13, and a common wetting agent.

A layer 26 of nickel-phosphourous is now deposited, also by electroplating as discussed before, over copper layer 24. A magnetic layer 28 of nickel-cobalt is now electroplated over layer 26 and the entire assembly is oxidized at a temperature in the range of approximately 580° to 680° F. for about 1 hour, in order to provide a protective layer 30. The nickel phosphorous layer 26 acts as a shield to prevent the copper from diffusing into the nickel cobalt layer 28 and affecting its magnetic characteristics.

A higher oxiding temperature is used in this second process in order to speed up the production of magnetic plated media. The fact that the nickel layer 22 becomes magnetic at such temperature is now not detrimental, since the copper layer 24 shields the intended magnetic layer 28 from the accidental magnetic layer 22.

The additional advantage of the process of this second embodiment, obtained by using the magnetic shielding copper layer 24, is that a process restriction present in the prior art has been eliminated. The process restriction arises because the nickel layer 22 will become magnetic, regardless of the optimization of the other parameters discussed above, between 2.5 and 4 metal turn-overs, commonly referred to as the X number. A metal turn-over is defined as a depletion and refurbishment cycle of the plating bath. The second process of the present invention produces a plated media disk that can allow nickel layer 22 to become magnetic, so that the plating bath can be used for more turn-overs, and so reducing the overall cost of the process.

This completes the description of the present invention. Some modification will be apparent to persons skilled in the art without departing from the spirit and scope of this invention. Accordingly, it is intended that this invention be not limited to the embodiments disclosed herein except as defined by the appended claims.

What is claimed is:

1. A process for producing magnetic plated media comprising, in sequence, the steps of:
   electrolessly plating a layer of nickel on an aluminum substrate;
   electroplating a layer of nickel-phosphorous on said plated substrate; and
   electroplating a layer of nickel-cobalt on said plated substrate.

2. The process of claim 1 further comprising the step of:
   oxidizing said plated media at a temperature and for a duration sufficient to provide a protective coating.

3. The process of claim 2 wherein said oxidizing temperature is below the nickel-magnetizing temperature.

4. The process of claim 2 further comprising the step of: electroplating a layer of copper after the plating of said nickel layer and before the electroplating of said nickel-phosphorous layer.

5. The process of claim 4 wherein said oxidizing temperature is at or above the nickel-magnetizing temperature.

* * * * *

UNITED STATES PATENT AND TRADEMARK OFFICE

Certificate

Patent No.: 4,581,109                                                         Patented: April 8, 1986

On petition requesting issuance of a certificate for correction of inventorship pursuant to 35 U.S.C. 256 it has been found that the above-identified patent, through error and without any deceptive intent, improperly sets forth the inventorship. Accordingly, it is hereby certified that the correct inventorship of this patent is:
Dan Goor, Everett Niles, Robert L. Stone, Francis P. Brooks, Harold B. Shukovsky and Yoon H. Choo.

Signed and Sealed this Twentieth day of February, 1990.

JOHN F. NEIBLING

*Supervisory Primary Examiner*
*Patent Examining Group 110*